United States Patent
Al-Otaibi et al.

(10) Patent No.: US 9,309,754 B2
(45) Date of Patent: Apr. 12, 2016

(54) METHOD TO IMPROVE CONFORMANCE CONTROL IN CARBON DIOXIDE FLOODING

(71) Applicant: Saudi Arabian Oil Company, Dhahran (SA)

(72) Inventors: Fawaz Al-Otaibi, Dhahran (SA); Sunil Kokal, Dhahran (SA)

(73) Assignee: SAUDI ARABIAN OIL COMPANY (SA)

( * ) Notice: Subject to any disclaimer, the term of this patent is extended or adjusted under 35 U.S.C. 154(b) by 270 days.

(21) Appl. No.: 13/784,975

(22) Filed: Mar. 5, 2013

(65) Prior Publication Data

US 2014/0251618 A1    Sep. 11, 2014

(51) Int. Cl.
*E21B 43/16* (2006.01)
*C09K 8/58* (2006.01)
*C09K 8/594* (2006.01)

(52) U.S. Cl.
CPC ............... *E21B 43/164* (2013.01); *C09K 8/58* (2013.01); *C09K 8/594* (2013.01); *E21B 43/166* (2013.01); *Y02P 90/70* (2015.11)

(58) Field of Classification Search
CPC ....... E21B 43/164; E21B 43/168; C09K 8/58; C09K 8/594
See application file for complete search history.

(56) References Cited

U.S. PATENT DOCUMENTS

| | | |
|---|---|---|
| 3,800,874 A | 4/1974 | Kern |
| 4,589,486 A | 5/1986 | Brown et al. |
| 4,605,066 A | 8/1986 | Djabbarah |
| 4,617,993 A | 10/1986 | Brown |
| 4,676,316 A | 6/1987 | Mitchell |
| 4,678,036 A | 7/1987 | Hartman et al. |
| 4,736,793 A | 4/1988 | Djabbarah |
| 5,056,596 A | 10/1991 | McKay et al. |
| 5,725,054 A | 3/1998 | Shayegi et al. |
| 7,882,893 B2 | 2/2011 | Fraim |
| 8,215,392 B2 | 7/2012 | Rao |
| 2012/0067568 A1 | 3/2012 | Palmer et al. |

FOREIGN PATENT DOCUMENTS

| | | | |
|---|---|---|---|
| CA | 1051341 A | * | 3/1979 |
| WO | 2009/012374 A1 | | 1/2009 |

OTHER PUBLICATIONS

Technical Insights (TI), Advances in Carbon Dioxide Injection Technologies, Sep. 30, 2008, Frost & Sullivan (2008).

(Continued)

*Primary Examiner* — Zakiya W Bates
(74) *Attorney, Agent, or Firm* — Bracewell LLP; Constance Gall Rhebergen; Brad Y. Chin

(57) ABSTRACT

Embodiments of the invention generally relate to the field of oil recovery from reservoirs. More specifically, embodiments of the invention relate to enhancing the recovery of oil using carbon dioxide flooding processes by providing a process to improve oil recovery from a reservoir by injecting through a well into a reservoir a heavy oil slug composition that includes heavy oil that is mixed carbon dioxide. Following injecting the heavy oil slug composition, a carbon dioxide slug that includes carbon dioxide is injected through the well into the reservoir.

19 Claims, 3 Drawing Sheets

(56) References Cited

OTHER PUBLICATIONS

Moritis, G., CO2 Injection Gains Momentum, Oil & Gas Journal, Apr. 17, 2006, p. 37, vol. 104, No. 15, PennWell Publishing Company (2006).

PCT International Search Report and The Written Opinion; dated Apr. 16, 2015; International Application No. PCT/US2014/020667; International File Date: Mar. 5, 2014.

Anonymous; Crude Tall Oil Recovery; Apr. 2, 2015; http://www.ahlundberginc.com/crude_tall_oil_recovery.htm; XP-055180889.

* cited by examiner

METHOD TO IMPROVE CONFORMANCE CONTROL IN CARBON DIOXIDE FLOODING

FIELD OF INVENTION

This invention generally relates to the field of oil recovery from reservoirs. More specifically, it relates to enhancing the recovery of oil using carbon dioxide flooding processes.

BACKGROUND OF INVENTION

Carbon dioxide flooding processes are an important enhanced oil recovery method to recover oil from reservoirs, including in both sandstone and carbonate reservoirs. Traditionally, approximately one third of the original oil in place is recovered by primary and secondary recovery processes. However, this typically leaves two-thirds of the oil trapped in reservoirs as residual oil after water flooding. An additional five to twenty percent of the oil may be recovered by carbon dioxide flooding processes. However, increasing the recovery beyond this has remained difficult because of several challenges. First is the gravity override of the injected carbon dioxide due to density differences between the injected carbon dioxide and resident fluids in the reservoir. The carbon dioxide, being lighter, tends to rise to the top of the reservoir, thereby bypassing some of the remaining oil. This results in poor oil recovery in the lower portion of the reservoir. This problem is especially acute in thick formations. The second challenge is viscous fingering that is caused by the lower viscosity of the injected carbon dioxide. Typical dense carbon dioxide viscosity at reservoir conditions is in the range of 0.05-0.1 cP, which is much lower than the viscosity of resident oil and brine. The resulting unfavorable mobility ratio leads to viscous fingering. This causes early carbon dioxide breakthrough, high carbon dioxide utilization factors, poor sweep efficiency and low overall oil recoveries. The third challenge is reservoir geology and heterogeneities, including high permeability streaks and fractures that can affect the sweep efficiency of a carbon dioxide enhanced oil recovery flooding processes. While traditional water-alternating-gas processes have shown to improve the mobility of carbon dioxide somewhat, traditional water-alternating-gas processes have not completely overcome these challenges.

Increasing the density and viscosity of carbon dioxide can alleviate many of these challenges and lead to substantially higher recovery than conventional carbon dioxide enhanced oil recovery processes. Carbon dioxide density can be increased by blending in heavier compatible materials. However, historically, limited success has been achieved using this approach.

Additionally, known methods use surfactants to foam or to create water in carbon dioxide reverse micelles. While creating a foam addresses the challenge of viscosity, it leaves the challenge of density unresolved. Although research results have demonstrated that surfactant-induced carbon dioxide foams are an effective method for mobility control in carbon dioxide foam flooding, the foam's long-term stability during a field application is difficult to maintain.

Moreover, even if a carbon dioxide thickener, whether a polymer or small molecule, is identified for use in enhanced oil recovery processes, operational constraints may be encountered by operators who would try to implement the technology in a pilot-test. Nearly all potential carbon dioxide thickeners are a solid at ambient temperature and a means of introducing a powder into the carbon dioxide stream must be employed, possibly by first dissolving the thickener in an organic solvent in order to form a concentrated, viscous, pumpable solution.

It is known the solubility of carbon dioxide in oil is greater than that of the solubility in water. Additionally, the diffusion rate of carbon dioxide from degassed oil to live oil in two similar phases is much higher than the diffusion rate of carbon dioxide from water to live oil.

The features and advantages of the present invention will be readily apparent to those skilled in the art upon a reading of the description of the preferred embodiments that follows.

SUMMARY OF THE INVENTION

One aspect of the invention provides a process to improve oil recovery from a reservoir. In some embodiments, the process includes injecting through a well into a reservoir a heavy oil slug composition that includes heavy oil that is mixed with carbon dioxide. The heavy oil has a density. The carbon dioxide also has a density. The heavy oil slug composition has a compositional density and a compositional viscosity. The compositional density is selected based on a density of oil in place in the reservoir. Following injecting the heavy oil slug composition, a carbon dioxide slug including carbon dioxide is injected through the well into the reservoir. In further embodiments, the carbon dioxide slug is followed by injections of water, and further injections of carbon dioxide slugs.

The heavy oil slug composition has a greater density than the carbon dioxide alone. This can open the pathways in the reservoir where the carbon dioxide cannot go alone. The carbon dioxide in the heavy oil slug composition diffuses from the heavy oil slug composition to the oil in place in the reservoir, achieving miscibility with the oil in place in the reservoir and forming an oil bank. The subsequent carbon dioxide slugs and water then push the heavy oil slug composition, resulting in the recovery of additional oil from the reservoir and recovery of at least a portion of the injected heavy oil from the heavy oil slug composition.

BRIEF DESCRIPTION OF THE DRAWINGS

So that the manner in which the features and advantages of the invention, as well as others that will become apparent, may be understood in more detail, a more particular description of the invention briefly summarized above may be had by reference to the embodiments thereof, which are illustrated in the appended drawings, which form a part of this specification. It is to be noted, however, that the drawings illustrate only various embodiments of the invention and are therefore not to be considered limiting of the invention's scope as it may include other effective embodiments as well.

DETAILED DESCRIPTION

Figure 1:
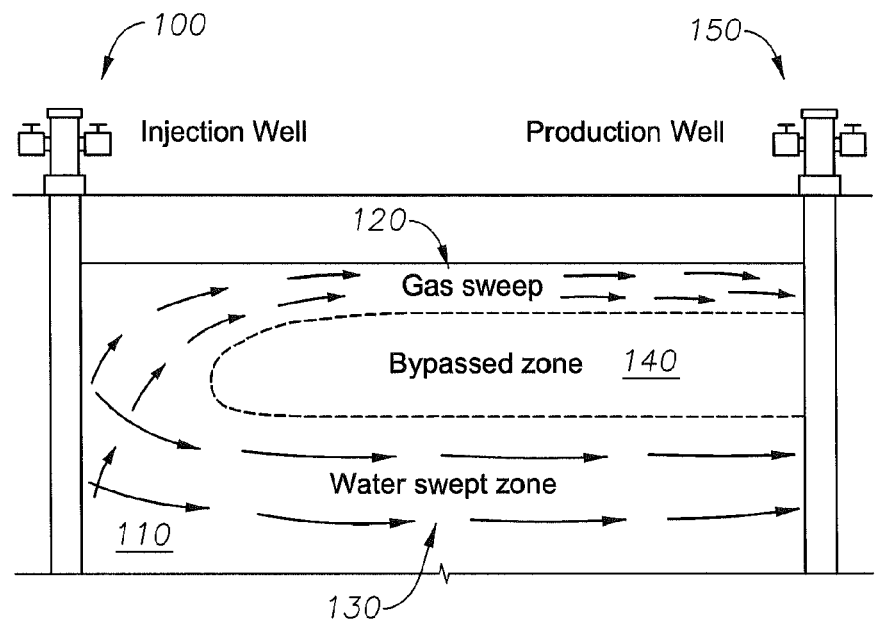
FIG. 1 is a drawing of a carbon dioxide enhanced oil recovery system known in the art.

In one aspect, embodiments of the invention are related to a process to improve oil recovery from a reservoir. In some embodiments, the process includes injecting through a well into a reservoir a heavy oil slug composition that includes heavy oil that is mixed with carbon dioxide. The heavy oil has a density. The carbon dioxide also has a density. The heavy oil slug composition has a compositional density and a compositional viscosity. The compositional density is selected based on a density of oil in place in the reservoir. Following injecting the heavy oil slug composition, a carbon dioxide slug including carbon dioxide is injected through the well into the reservoir.

In further embodiments, the carbon dioxide slug is followed by water, and further carbon dioxide slugs. In some embodiments, this is in water-alternating-gas fashion. For example, in some embodiments, following the step of injecting carbon dioxide, water is injected. In some embodiments, the process includes a second step of injecting through the well into the reservoir a carbon dioxide slug that includes carbon dioxide, after the water is injected. In further embodiments, the process includes a second step of injecting water following the second step of injecting the carbon dioxide slug through the well into the reservoir. In further embodiments, the steps of injecting water and carbon dioxide slugs is repeated in water-alternating gas fashion to enhance recovery of oil from a reservoir.

In an alternative embodiment, water is injected through the well into the reservoir in a continuous manner, so as to push the carbon dioxide slug into the reservoir.

In some embodiments, the viscosity of the heavy oil slug composition is greater than that of the oil in place in the reservoir. In further embodiments, the greater viscosity contributes to the mobility of the carbon dioxide in the reservoir and further contributes to addressing the problem of gravity override and viscous fingering in enhanced oil recovery processes.

In some embodiments, the density of the heavy oil is greater than the density of the oil in place in the reservoir. In some embodiments, the density of the heavy oil is selected such that when the heavy oil is mixed with the carbon dioxide, the resulting compositional density of the heavy oil slug is about the same as that of the density of the oil in the reservoir.

In further embodiments, after the heavy oil and the carbon dioxide are mixed, the resulting compositional density of the heavy oil slug composition is at least about 10% to about 30% greater than the density of the carbon dioxide. In further embodiments, the resulting compositional density of the heavy oil slug composition is at least 10% greater than the density of the carbon dioxide. In further embodiments, the resulting compositional density of the heavy oil slug composition is at least 15% greater than the density of the carbon dioxide. In further embodiments, the resulting compositional density of the heavy oil slug composition is at least 20% greater than the density of the carbon dioxide. In further embodiments, the resulting compositional density of the heavy oil slug composition is at least 25% greater than the density of the carbon dioxide. In further embodiments, the resulting compositional density of the heavy oil slug composition is at least 30% greater than the density of the carbon dioxide.

In general, the term heavy oil indicates that the oil has a higher density or specific gravity than that of the oil in place in the reservoir. In further embodiments, the heavy oil is any type of crude oil that is heavier than the oil in place in the reservoir. In further embodiments, the heavy oil is any oil which does not flow easily. In some embodiments, the heavy oil has one or more of the following properties: high specific gravity, low hydrogen to carbon ratios, high carbon residues, high content of asphaltenes, heavy metal content, sulfur content, and nitrogen content. In some embodiments, the heavy oil includes any liquid petroleum with an API gravity of less than 20°. In some embodiments, heavy oil is defined as any liquid petroleum with a gravity of less than 10° API (i.e. with density greater than 1000 kg/m3 or, equivalently, a specific gravity greater than 1) and a reservoir viscosity of no more than 10,000 centipoises. In further embodiments, the heavy oil has a heavier molecular composition than the oil in place in the reservoir.

In some embodiments, the heavy oil is any degassed oil. Degassed oils include oils where a significant portion of the associated gases have been liberated from the oil. In further embodiments, the degassed oil has one or more of the following properties: higher density than the oil in place in the reservoir, heavier molecular composition than the oil in place in the reservoir, and higher specific gravity than the oil in place in the reservoir. In further embodiments, the heavy oil is a waste product from a refinery process. In further embodiments, the waste product has one or more of the following properties: higher density than the oil in place in the reservoir, heavier molecular composition than the oil in place in the reservoir, and higher specific gravity than the oil in place in the reservoir.

In further embodiments, after the heavy oil and the carbon dioxide are mixed, the carbon dioxide is present in the heavy oil slug composition at a mol % of between about 89 and 99%. In further embodiments, the carbon dioxide is present in the heavy oil slug composition at a mol % of about 89%. In further embodiments, the carbon dioxide is present in the heavy oil slug composition at a mol % of about 90%. In further embodiments, the carbon dioxide is present in the heavy oil slug composition at a mol % of about 91%. In further embodiments, the carbon dioxide is present in the heavy oil slug composition at a mol % of about 92%. In further embodiments, the carbon dioxide is present in the heavy oil slug composition at a mol % of about 93%. In further embodiments, the carbon dioxide is present in the heavy oil slug composition at a mol % of about 94%. In further embodiments, the carbon dioxide is present in the heavy oil slug composition at a mol % of about 95%. In further embodiments, the carbon dioxide is present in the heavy oil slug composition at a mol % of about 96%. In further embodiments, the carbon dioxide is present in the heavy oil slug composition at a mol % of about 97%. In further embodiments, the carbon dioxide is present in the heavy oil slug composition at a mol % of about 98%. In further embodiments, the carbon dioxide is present in the heavy oil slug composition at a mol % of about 99%.

In further embodiments, the carbon dioxide is at or above supercritical conditions when it is mixed with the heavy oil. In other embodiments, the carbon dioxide is at or above supercritical conditions when it is injected into the welt. In further embodiments, the carbon dioxide is at or above supercritical conditions once it reaches the area of the reservoir from which oil is to be recovered.

In further embodiments, the carbon dioxide is liquid or liquid-like when it is mixed with the heavy oil. In other embodiments, the carbon dioxide is liquid or liquid-like when the heavy oil slug composition it is injected into the well. In further embodiments, the carbon dioxide is liquid or liquid-like once it reaches the area of the reservoir from which oil is to be recovered.

In further embodiments, the carbon dioxide is gas or gas-like when it is mixed with the heavy oil. In other embodiments, the carbon dioxide is gas or gas-like when the heavy oil slug composition is injected into the well. In further embodiments, the carbon dioxide is gas or gas-like once it reaches the area of the reservoir from which oil is to be recovered.

In further embodiments, the heavy oil slug composition is saturated with carbon dioxide, meaning that no more carbon dioxide can be dissolved in the heavy oil, at the operating pressure at which it is injected. In some embodiments, the injection pressure is about 500 psi greater than the reservoir pressure. In further embodiments, the heavy oil slug is 90-99% saturated with carbon dioxide at the operating pressure at which it is injected. In further embodiments, the heavy oil slug is 99% saturated with carbon dioxide. In further embodiments, the heavy oil slug is 98% saturated with carbon dioxide. In further embodiments, the heavy oil slug is 97% saturated with carbon dioxide. In further embodiments, the heavy oil slug is 96% saturated with carbon dioxide. In further embodiments, the heavy oil slug is 95% saturated with carbon dioxide. In further embodiments, the heavy oil slug is 94% saturated with carbon dioxide. In further embodiments, the heavy oil slug is 93% saturated with carbon dioxide. In further embodiments, the heavy oil slug is 92% saturated with carbon dioxide. In further embodiments, the heavy oil slug is 91% saturated with carbon dioxide. In further embodiments, the heavy oil slug is 90% saturated with carbon dioxide.

In another aspect, embodiments of the invention provide a process to improve oil recovery from a reservoir. In some embodiments, the process includes injecting through a well into a reservoir a heavy oil slug composition that includes heavy oil that is mixed carbon dioxide. The heavy oil has a density. The carbon dioxide also has a density. The heavy oil slug composition has a compositional density and a compositional viscosity. The compositional density is selected based on a density of oil in place in the reservoir. Following injecting the heavy oil slug composition, a carbon dioxide slug including carbon dioxide is injected through the well into the reservoir. Water is then injected through the well into the reservoir. The result is that the mobility of the carbon dioxide is improved over that of carbon dioxide being injected without a heavy oil slug composition.

In further embodiments, the carbon dioxide will diffuse readily from the heavy oil slug composition to the oil in place in the reservoir, thus creating a miscible zone that will bank up the oil. In further embodiments, the problems associated with gravity override and viscous fingering are reduced as a result of the process.

In further embodiments, a substantial portion of the heavy oil injected into the reservoir in the heavy oil slug composition is also recovered from the reservoir.

The solubility of carbon dioxide in oil is up to four times greater than the solubility of carbon dioxide in water. Given that the solubility of carbon dioxide in oil is greater than that of the solubility in water, some of the embodiments of the present invention lead to less carbon dioxide consumption and enable the recovery of oil with less pore volume injected. Using less carbon dioxide provides an economic advantage. Furthermore, given that the diffusion rate of carbon dioxide from degassed oil to live oil in two similar phases is much higher than the diffusion rate of carbon dioxide from water to live oil, some of the embodiments of the present invention lead to less carbon dioxide consumption and enable the recovery of oil with less pore volume injected.

In some embodiments, the present invention will improve mobility control of carbon dioxide in reservoirs. In further embodiments, mobility control of supercritical carbon dioxide with be improved. By improving the mobility control of carbon dioxide, gravity override problems and viscous fingering issues are addressed.

In further embodiments, oil recovery from a reservoir will be enhanced over that of traditional enhanced oil recovery processes as a result of at least one of the following: enhancing mobility control of the carbon dioxide, addressing the gravity override issue experienced in traditional enhanced oil recovery processes, and addressing the issue of viscous fingering that occurs in enhanced oil recovery processes. In further embodiments, oil recovery from a reservoir will be increased at least about 5% over that of traditional enhanced oil recovery processes. In further embodiments, oil recovery from a reservoir will be increased at least about 10% over that of traditional enhanced oil recovery processes. In further embodiments, oil recovery from a reservoir will be increased at least about 15% over that of traditional enhanced oil recovery processes.

In further embodiments, the heavy oil used in the processes is selected based on the properties of the oil in place in the reservoir. In further embodiments, the heavy oil is selected based on the density of the oil in place in the reservoir. In further embodiments, the heavy oil is selected based on the viscosity of the oil in place in the reservoir. In further embodiments, the heavy oil is selected based on both the density and the viscosity of the oil in place in the reservoir.

In some embodiments, the size of the heavy oil slug composition injected through a well into is determined through a series of steps. First, a heavy oil is selected based on its density and viscosity. Then, the carbon dioxide solubility in the selected heavy oil is calculated at the injection pressure. The density and the viscosity of the resulting heavy oil slug compositions are compared to the density and viscosity of the oil in place in the reservoir to ensure that the density is comparable or about that of the oil in place in the reservoir and that the viscosity is greater than the viscosity of the oil in place in the reservoir. The volume of oil used is determined based on the volume that is needed to dissolve the carbon dioxide and achieve the desired density and viscosity.

A person of skill in the art will appreciate that an assessment can be performed of prior carbon dioxide water-alternating-gas runs in a given reservoir to determine the preferred amount of carbon dioxide to use in a given reservoir. A person of skill in the art will further appreciate that various simulations and analysis will allow for the determination of the size of the heavy oil slug composition to inject based on the amount of carbon dioxide desired for delivery to the reservoir. A person of skill in the art will further understand that various simulations and analyses can be conducted so as to optimize the various parameters of a given process, including total amount of oil recovered, amount of heavy oil from the heavy oil slug composition recovered, and amount of carbon dioxide used for a given process. A person of skill in the art will further understand that based on the information derived from the assessment, simulations, and/or analyses, an economic analysis can be conducted for a given process to further optimize the process from an economic perspective.

The present invention will improve the recovery of oil over traditional enhanced oil recovery systems by enhancing recovery of oil from bypassed zones. For instance, FIG. 1 is a drawing of a traditional carbon dioxide enhanced oil recovery system. In the previously known systems, such as the one shown in FIG. 1, carbon dioxide is injected through well 100 into a reservoir 110. In traditional process, there is a gravity override, whereby the carbon dioxide rises 120, a water sweep 130 falls, and oil containing regions are completely untouched by the carbon dioxide. This results in a bypassed zone 140 from which oil is not fully recovered at the production well 150. The present invention reduces or eliminates the bypassed zone 140. This is accomplished by increasing the density of the carbon dioxide injected into the reservoir and thus reduces the gravity override that is experienced within the system. Additionally, the viscosity of the carbon dioxide is increased.

Figure 2:
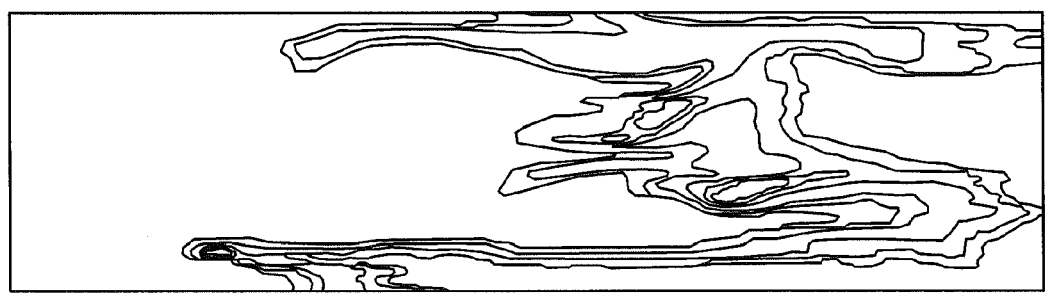
FIG. 2 shows the viscous fingering that is caused by the lower viscosity of injected carbon dioxide in traditional carbon dioxide enhanced oil recovery system known in the art.

The process of various embodiments of the present invention addresses the viscosity challenge associated with traditional enhanced oil recovery systems because the viscosity of the carbon dioxide is altered by mixing it will heavy oil to create heavy oil slug compositions. This overcomes the viscous fingering of the traditional carbon dioxide enhanced oil recovery systems, such as that shown in FIG. 2. As shown in FIG. 2, viscous fingering is caused by the lower viscosity of injected carbon dioxide in traditional carbon dioxide enhanced oil recovery processes. The present invention will reduce this fingering effect by the viscosity of the carbon dioxide is altered by mixing it will heavy oil to create heavy oil slug compositions, thus increasing the oil recovery from a given reservoir.

Figure 3:
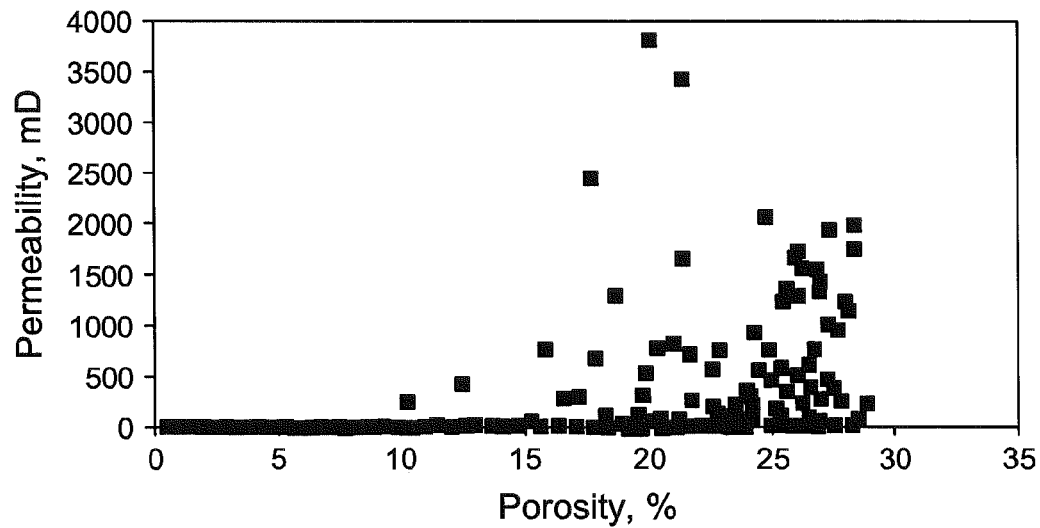
FIG. 3 shows that reservoir geology and heterogeneities can include high permeability streaks and fractures that can affect the sweep efficiency of a carbon dioxide enhanced oil recovery flood.

The present invention will also address the reservoir geology and heterogeneities issues of wells. As shown in FIG. 3, reservoir geology and heterogeneities can include high permeability streaks and fractures that can affect the sweep efficiency of a carbon dioxide enhanced oil recover process. The present invention will address these issues by increasing the density and viscosity of the carbon dioxide being injecting into the reservoir, thus increasing the sweep efficiency of the carbon dioxide oil recovery process.

Figure 4:
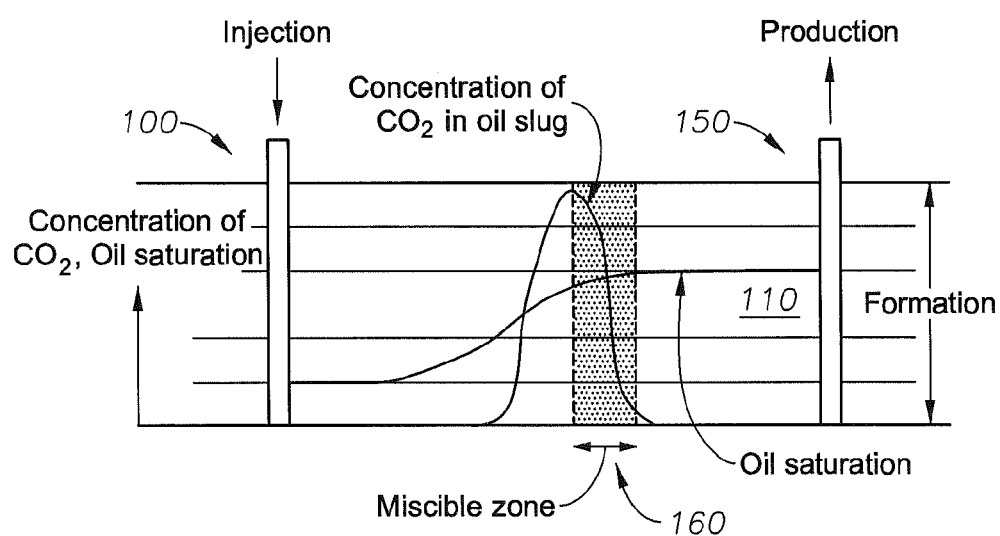
FIG. 4 shows an embodiment of the present invention whereby the carbon dioxide in the heavy oil slug composition increases the recovery of oil from a reservoir.

An exemplary diagram of an embodiment of the invention is shown in FIG. 4. As shown in FIG. 4, once injected through a well 100 into the reservoir 110, the carbon dioxide from the heavy oil slug composition diffuses into the oil in place in the reservoirs across a zone of miscibility 160. The concentration of the carbon dioxide in the heavy oil slug composition decreases as the concentration of carbon dioxide in the oil in place in the reservoir increases. The exemplary process shown in FIG. 4 illustrates how the gravity override issue is addressed thereby increasing production at well 150.

EXAMPLES

To facilitate a better understanding of the present invention, the following examples of preferred embodiments are given. In no way should the following examples be read to limit, or to define, the scope of the invention.

Figure 5:
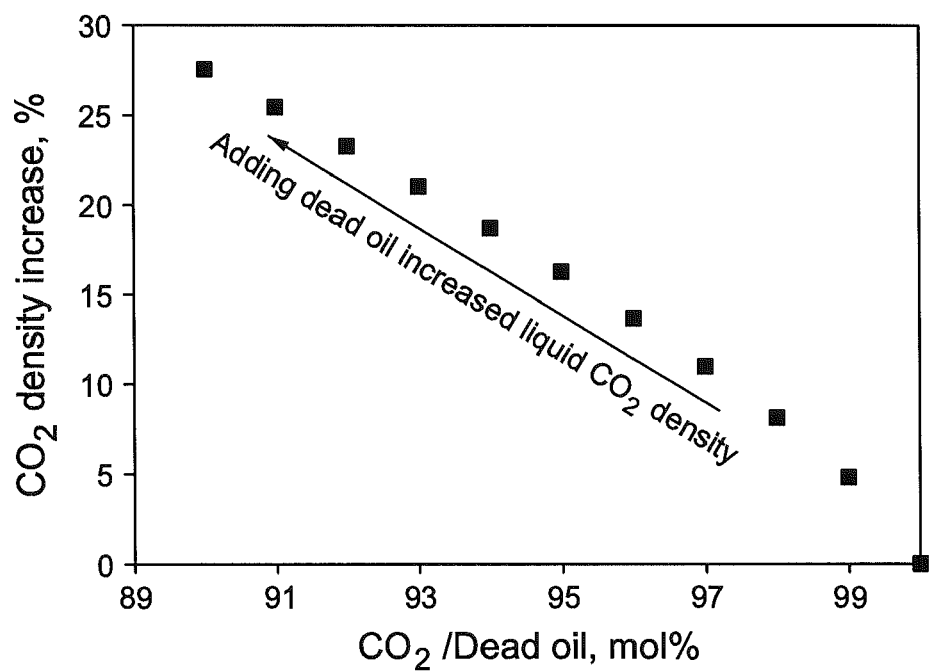
FIG. 5 shows the increase in the compositional density as related to the mol % of carbon dioxide to heavy oil.

A degassed (dead) oil was mixed with liquid carbon dioxide at 3200 psi and 212° F. and at a range of carbon dioxide mol % from 89 to 100%. As shown in FIG. 5, adding degassed oil increased the resulting heavy oil slug compositional density by up to about 30% as compared to the density of the liquid carbon dioxide alone. Adding 10 mol % of degassed oil to liquid carbon dioxide resulted in nearly 28% increase in the density of the heavy oil slug compositional density as compared to the density of the liquid carbon dioxide alone. Adding 1 mol % of degassed oil to liquid carbon dioxide resulted in nearly 5% increase in the density of the heavy oil slug compositional density as compared to the density of the liquid carbon dioxide alone. Thus, even low amounts of degassed oil are effective in increasing the density of the liquid carbon dioxide.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are claimed in terms of "comprising," "containing," or "including" various components or steps, the compositions and methods can also "consist essentially of" or "consist of" the various components and steps. All numbers and ranges disclosed above may vary by some amount. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

That which is claimed is:

1. A process to improve oil recovery from a reservoir, the process comprising the steps of:
    injecting through a well into a reservoir a heavy oil slug composition comprising heavy oil having a density mixed with carbon dioxide having a density, said heavy oil slug composition having a compositional density and a compositional viscosity, the compositional density being selected based on a density of oil in place in the reservoir; and
    injecting through the well into the reservoir a carbon dioxide slug comprising carbon dioxide, the carbon dioxide slug following the heavy oil slug composition,
    wherein the density of the heavy oil is greater than the density of the oil in place in the reservoir.

2. process of claim 1 further comprising the step of injecting through the well into the reservoir water, the water following the carbon dioxide slug.

3. The process of claim 2 further comprising a second step of injecting through the well into the reservoir a carbon dioxide slug comprising carbon dioxide, the carbon dioxide slug the following the water.

4. The process of claim 3 further comprising a second step of injecting through the well into the reservoir water, the water following the second step of injecting through the well into the reservoir the carbon dioxide slug.

5. The process of claim 1 wherein the viscosity of the heavy oil slug composition is greater than that of the oil in place in the reservoir.

6. process of claim 1 wherein the heavy oil is any degassed oil.

7. The process of claim 1 wherein the heavy oil is waste from any refinery process.

8. The process of claim 1 wherein the carbon dioxide is present in the heavy oil slug composition at a mol % of between 89 and 99%.

9. The process of claim 1 wherein the compositional density of the heavy oil slug composition is at least 10% greater than the density of the carbon dioxide.

10. The process of claim 1 wherein the compositional density of the heavy oil slug composition is at least 15% greater than the density of the carbon dioxide.

11. The process of claim 1 wherein the compositional density of the heavy oil slug composition is at least 20% greater than the density of the carbon dioxide.

12. The process of claim 1 wherein the compositional density of the heavy oil, slug composition is at least 25% greater than he density of the carbon dioxide.

13. The process of claim 1 wherein the compositional density of the heavy oil slug composition is at least 30% greater than the density of the carbon dioxide.

14. The process of claim 1 wherein the carbon dioxide is at or above supercritical conditions.

15. The process of claim 1 wherein the carbon dioxide is liquid.

16. The process of claim 1 wherein the heavy oil slug composition is saturated with carbon dioxide.

17. process of claim 1 wherein the heavy oii slug composition is liquid-like or gas-like.

18. The process of claim 1 wherein the compositional density of the heavy oil slug composition is selected such that it is about the same as the density of the oil in place in the reservoir.

19. A process to improve oil recovery from a reservoir, the process comprising the steps of:

injecting through a well into a reservoir a heavy oil slug composition comprising heavy oil having a density mixed with carbon dioxide having a density, said heavy oil slug composition having a compositional density and a compositional viscosity, the compositional density being about the same as a density of the oil in place in the reservoir;

injecting through the well into the reservoir a carbon dioxide slug comprising carbon dioxide, the carbon dioxide slug following the heavy oil slug composition; and injecting through the well into the reservoir water, the water following the carbon dioxide slug, wherein the control of the mobility of the carbon dioxide is improved over that of carbon dioxide being injected without a heavy oil slug composition.

* * * * *

UNITED STATES PATENT AND TRADEMARK OFFICE
CERTIFICATE OF CORRECTION

PATENT NO. : 9,309,754 B2  Page 1 of 1
APPLICATION NO. : 13/784975
DATED : April 12, 2016
INVENTOR(S) : Fawaz Al-Otaibi et al.

It is certified that error appears in the above-identified patent and that said Letters Patent is hereby corrected as shown below:

In the Claims

In Column 8, Line 41, Claim 2, the first word appears as "process" and should read --The process--.

In Column 8, Line 55, Claim 6, the first word appears as "process" and should read --The process--.

In Column 9, Line 5, Claim 12, the fifth word appears as "oil," and should read --oil--.

In Column 9, Line 6, Claim 12, the third word appears as "he" and should read --the--.

In Column 9, Line 16, Claim 17, the first word appears as "process" and should read --The process--.

Signed and Sealed this
Seventh Day of June, 2016

Michelle K. Lee
*Director of the United States Patent and Trademark Office*